United States Patent
Akamatsu

(10) Patent No.: US 10,655,755 B2
(45) Date of Patent: May 19, 2020

(54) SENSOR CONNECTION STRUCTURE

(71) Applicant: TLV CO., LTD., Hyogo (JP)

(72) Inventor: Shigeo Akamatsu, Kakogawa (JP)

(73) Assignee: TLV CO., LTD., Hyogo (JP)

( * ) Notice: Subject to any disclaimer, the term of this patent is extended or adjusted under 35 U.S.C. 154(b) by 0 days.

(21) Appl. No.: 15/851,581

(22) Filed: Dec. 21, 2017

(65) Prior Publication Data

US 2018/0119845 A1    May 3, 2018

Related U.S. Application Data

(63) Continuation of application No. PCT/JP2016/068973, filed on Jun. 27, 2016.

(30) Foreign Application Priority Data

Jul. 10, 2015    (JP) .................... 2015-139134

(51) Int. Cl.
*F16K 37/00*    (2006.01)
*G05B 23/02*    (2006.01)
*F16T 1/48*    (2006.01)
*H01B 7/17*    (2006.01)

(52) U.S. Cl.
CPC ............ *F16K 37/0083* (2013.01); *F16T 1/48* (2013.01); *G05B 23/02* (2013.01); *H01B 7/17* (2013.01)

(58) Field of Classification Search
CPC .............. F16T 1/48; G05B 23/02; H01B 7/17
See application file for complete search history.

(56) References Cited

U.S. PATENT DOCUMENTS 1,577,994 A * 3/1926 West ..................... E02F 3/188
                                                            37/94
3,827,283 A * 8/1974 Lerner .................. G01M 3/2846
                                                            434/126

(Continued)

FOREIGN PATENT DOCUMENTS

CN        101101698 A       1/2008
CN        101994902 A       3/2011

(Continued)

OTHER PUBLICATIONS

The extended European search report issued by the European Patent Office dated Jun. 22, 2018, which corresponds to European Patent Application No. 16824253.5-1008 and is related to U.S. Appl. No. 15/851,581.

(Continued)

*Primary Examiner* — Angelisa L. Hicks
(74) *Attorney, Agent, or Firm* — Studebaker & Brackett PC

(57) ABSTRACT

A sensor connection structure is disposed in a manifold including a main pipe, a plurality of branch pipes connected to each of left and right of the main pipe, and a plurality of steam traps (valves) disposed in the branch pipes. The sensor connection structure includes: a plurality of sensors respectively disposed on the steam traps; a plurality of connection boxes arranged along an axis of the main pipe, connected to each other in series through electric wire pipes, and connected to the plurality of sensors through electric wire pipes; and a terminal unit connected to one of the plurality of connection boxes through an electric wire pipe.

4 Claims, 5 Drawing Sheets

(56) References Cited

U.S. PATENT DOCUMENTS

| | | | | |
|---|---|---|---|---|
| 6,896,066 B2* | 5/2005 | Gil | ............... | A62C 37/12 |
| | | | | 169/46 |
| 2009/0289808 A1* | 11/2009 | Prammer | ............ | E21B 17/003 |
| | | | | 340/853.7 |
| 2010/0299891 A1* | 12/2010 | Myers | ............ | F16B 2/12 |
| | | | | 24/457 |
| 2011/0036424 A1 | 2/2011 | Oike et al. | | |
| 2011/0295561 A1* | 12/2011 | Nagase | ............ | G05B 19/4183 |
| | | | | 702/188 |
| 2012/0139725 A1* | 6/2012 | Grumstrup | ......... | F16K 37/0091 |
| | | | | 340/540 |

FOREIGN PATENT DOCUMENTS

| | | |
|---|---|---|
| JP | 2006-003086 A | 1/2006 |
| JP | 2011-060269 A | 3/2011 |
| JP | 2012-184626 A | 9/2012 |
| JP | 5674190 B2 | 2/2015 |
| JP | 2015-97098 A | 5/2015 |

OTHER PUBLICATIONS

International Search Report issued in PCT/JP2016/068973; dated Jul. 19, 2016.

Communication pursuant to Article 94(3) EPC issued by the European Patent Office dated Apr. 4, 2019, which corresponds to European Patent Application No. 16 824 253.5-1008 and is related to U.S. Appl. No. 15/851,581.

An Office Action mailed by the State Intellectual Property Office of the People's Republic of China dated Jul. 2, 2019, which corresponds to Chinese Patent Application No. 201680037452.4 and is related to U.S. Appl. No. 15/851,581; with English translation.

\* cited by examiner

SENSOR CONNECTION STRUCTURE

CROSS-REFERENCE TO RELATED APPLICATION

This is a continuation of PCT International Application PCT/JP2016/068973 filed on Jun. 27, 2016. The disclosure of this application including the specifications, the drawings, and the claims are hereby incorporated by reference in its entirety.

FIELD

The present application relates to a sensor connection structure for connecting, to a terminal unit, a plurality of sensors disposed in a pipe unit including a main pipe and a plurality of branch pipes.

BACKGROUND

Japanese Patent No. 5674190, for example, describes a sensor connection structure disposed in a pipe unit (manifold). The pipe unit includes a main pipe and a plurality of branch pipes connected to the left and right of the main pipe. Each of the branch pipes is provided with a valve such as a steam trap. In the pipe unit, drain (condensate) generated by condensation of steam flows from the branch pipes into the main pipe and is collected therein. The sensor connection structure includes a plurality of sensors disposed on the steam traps and a terminal unit disposed on the main pipe. Each of the sensors detects operating states (vibrations and temperature) of a corresponding one of the steam traps. The sensors are connected to the terminal unit by electric wires (lead wires), and information on the operating states detected by the sensors is sent to the terminal unit. The terminal unit transmits and receives information on the operating states to/from a central management device. In this manner, the operating states of the steam traps are monitored.

In the sensor connection structure described in Japanese Patent No. 5674190, the terminal unit is connected to the sensors by electric wires so that wiring to the terminal unit might become complex. To avoid this complexity, it is conceivable to perform wireless communication between the terminal unit and the sensors. In this case, however, transmission and reception of radio waves might be difficult in some installation conditions of the terminal unit and the sensors, and thus, accuracy in monitoring operating states of the valves might be impaired.

A technique disclosed in the present application has been made in view of the foregoing situations, and has an object to provide a sensor connection structure that can ensure transmission, to a terminal unit, of information on operating states detected by a plurality of sensors while reducing complexity of wiring between the sensors and the terminal unit.

SUMMARY

To achieve the object, in the technique disclosed in the present application, a plurality of connection boxes connected in series are disposed on a main pipe of a pipe unit, and a plurality of sensors are connected to a terminal unit through the connection boxes.

Specifically, the technique disclosed in the present application is based on a sensor connection structure configured to be disposed in a pipe unit including a main pipe, a plurality of branch pipes connected to each of left and right of the main pipe, and a plurality of valves disposed on the branch pipes and configured to allow fluid to flow in the pipe unit. The sensor connection structure according to an aspect of the present application includes a plurality of sensors, a plurality of connection boxes, and a terminal unit. The plurality of sensors are respectively disposed on the plurality of valves and are used for detecting operating states of the valves. The plurality of connection boxes are arranged along an axis of the main pipe, connected to each other in series through electric wire pipes, and connected to the plurality of sensors through electric wire pipes. The terminal unit is connected to one of the plurality of connection boxes through an electric wire pipe. The electric wire pipes are pipes housing electric wires (lead wires) therein.

As described above, in the sensor connection structure according to the aspect of the present application, the serially connected connection boxes are connected to the sensors, and one of the connection boxes is connected to the terminal unit. That is, in the sensor connection structure according to the aspect of the present application, the sensors are connected to one of the serially connected connection boxes, and one connection box is connected to the terminal unit. Accordingly, it is possible to reduce complexity of wires (pipes) between the sensors and the terminal unit. In addition, in the sensor connection structure according to the aspect of the present application, since the plurality of connection boxes are arranged along the axis of the main pipe, the connection boxes can be sequentially connected to the main pipe along the axis of the main pipe. In this manner, wires (pipes) between the connection boxes and the terminal unit can be made compact, and thus, complexity of wires (pipes) can be further reduced. Furthermore, in the sensor connection structure according to the aspect of the present application, the sensors, the connection boxes, and the terminal unit are connected to each other through electric wire pipes. Thus, independently of installation situations of the sensors and the terminal unit, information on operating states of the valves detected by the sensors can be transmitted to the terminal unit without fail.

DESCRIPTION OF EMBODIMENTS

Embodiments of the present application will be described with reference to the drawings. The following embodiments are merely preferred examples in nature, and are not intended to limit techniques disclosed in this application, applications, and use of the application.

First Embodiment

Figure 1:
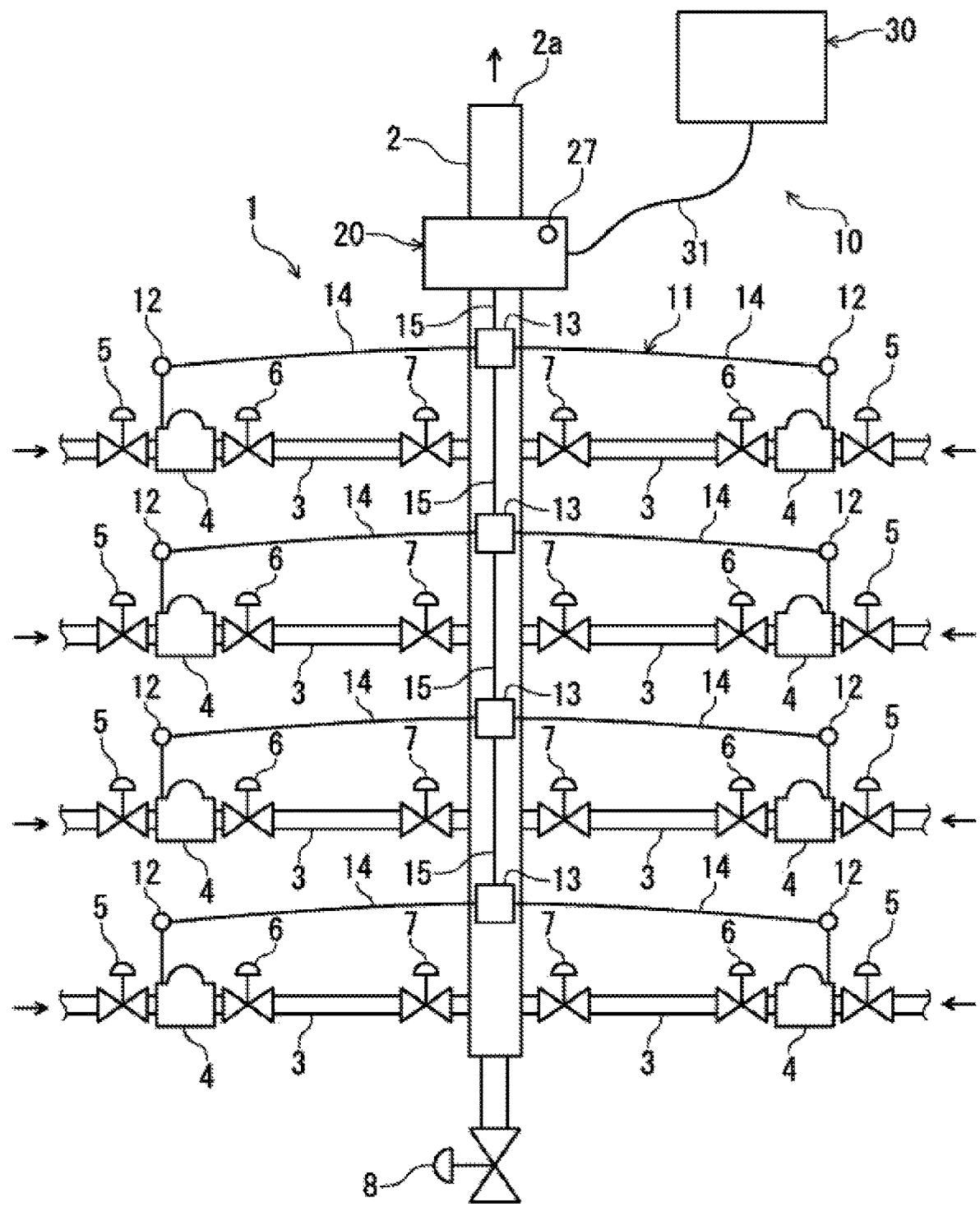
FIG. 1 is a front view schematically illustrating a general configuration of a manifold and an operating state monitoring device according to a first embodiment.

A first embodiment of the present application will be described with reference to FIGS. 1 through 3. As illustrated in FIG. 1, a manifold 1 according to this embodiment includes a main pipe 2 and a plurality of (eight in this embodiment) branch pipes 3, and constitutes a pipe unit in which drain (condensate) flows. This manifold 1 is provided with an operating state monitoring device 10 having a sensor connection structure 11 according to claims of the present application.

In the manifold 1, the main pipe 2 extends vertically, and four branch pipes 3 are connected to each of the left and right of the main pipe 2. Each of the branch pipes 3 has a diameter smaller than that of the main pipe 2. The branch pipes 3 are arranged along the axis of the main pipe 2 (i.e., in the vertical direction) at each of the left and right of the main pipe 2. The branch pipes 3 extend horizontally from the main pipe 2 in such a manner that left and right branch pipes 3 are opposed to each other. As indicated by arrows in FIG. 1, in the manifold 1, drain flows into the main pipe 2 through the branch pipes 3 and is collected therein, and the drain collected in the main pipe 2 is discharged from an outlet 2a at the upper end of the main pipe 2. That is, in the manifold 1 according to this embodiment, the main pipe 2 constitutes collecting pipes for drain.

Each of the branch pipes 3 is provided with four valves. Specifically, in each of the branch pipes 3, an inlet valve 5, a steam trap 4, an outlet valve 6, and an inlet valve 7 are arranged in this order from the upstream side. The steam trap 4 is used for automatically discharging only inflow drain to the downstream side. Each of the two inlet valves 5 and 7 and the outlet valve 6 is a shut-off valve. A blow down valve 8 is disposed at the lower end of the main pipe 2.

Figure 3:
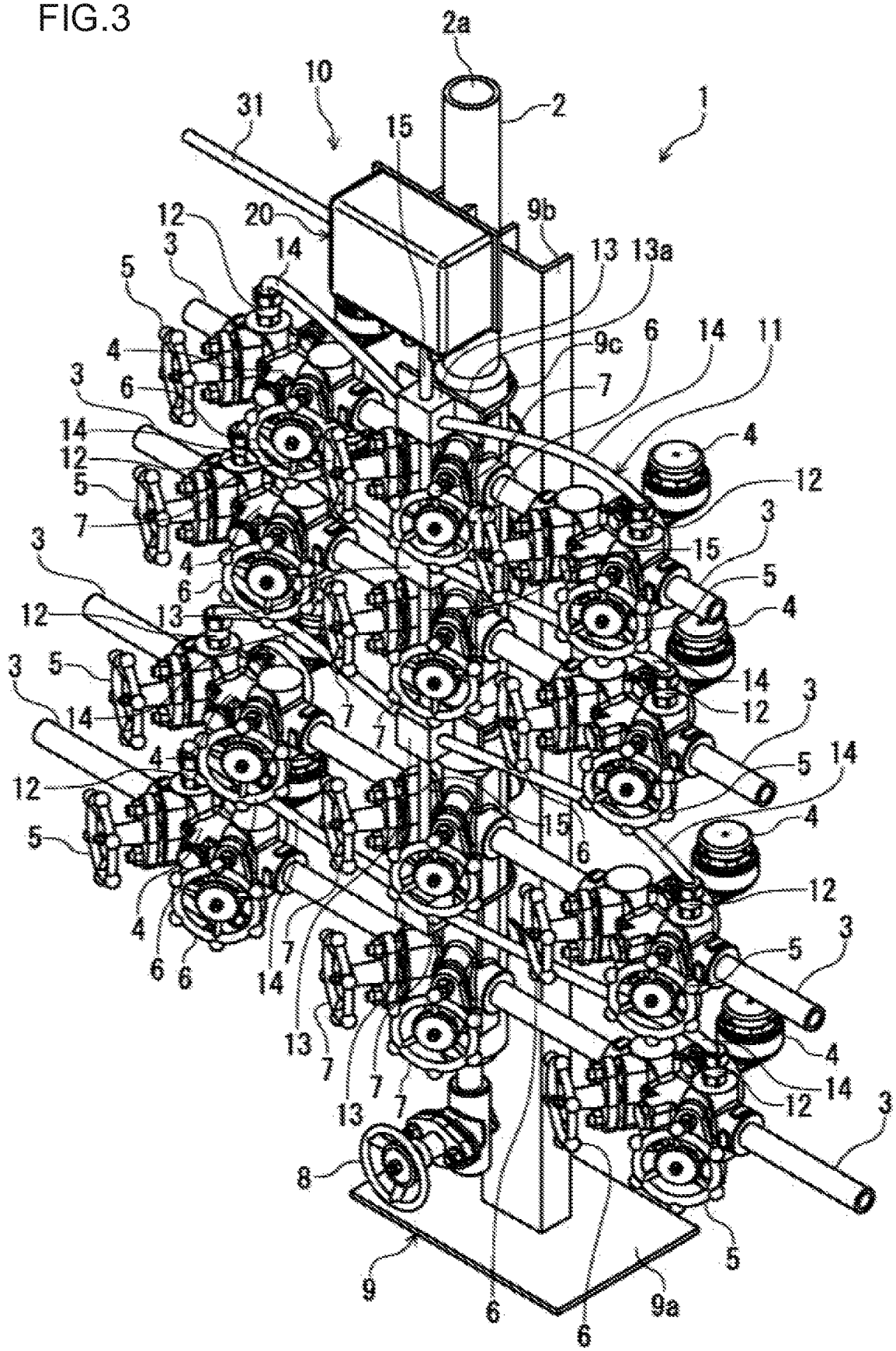
FIG. 3 is a perspective view illustrating the general configuration of the manifold and the operating state monitoring device according to the first embodiment when viewed from the front.

As illustrated in FIG. 3, the manifold 1 according to this embodiment is supported by an attachment base 9. The attachment base 9 includes a base plate 9a and a strut 9b. The base plate 9a is a portion to be grounded. The strut 9b extends vertically from the upper surface of the base plate 9. The strut 9b is a so-called channel having a U-shaped cross section. The manifold 1 is supported by attaching the main pipe 2 to the front side (surface side) of the strut 9b. That is, the strut 9b is disposed at the rear side of the main pipe 2 (at the back in the drawing sheet of FIG. 1).

The operating state monitoring device 10 monitors operating states of the plurality of (eight) steam traps 4. As illustrated in FIG. 1, the operating state monitoring device 10 includes the sensor connection structure 11 disposed in the manifold 1 and the central management device 30 disposed in another place. The sensor connection structure 11 includes a plurality of (eight in this embodiment) sensors 12, a plurality of (four in this embodiment) connection boxes 13, and one terminal unit 20.

Each of the sensors 12 is attached to an associated one of the eight steam traps 4. The sensors 12 detect operating states (e.g., vibrations and temperature) of the steam traps 4, and are of a wired communication type. The sensors 12 are disposed at inlet portions of the steam traps 4.

The four connection boxes 13 are disposed at the front side of the main pipe 2 (at the front in the drawing sheet of FIG. 1). The four connection boxes 13 are arranged along the axis of the main pipe 2, and are connected to each other in series through electric wire pipes 15. Each of the four connection boxes 13 is associated with two sensors 12 that are respectively located at the left and right of the main pipe 2, and is connected to these two sensors 12 through electric wire pipes 14. That is, each of the four connection boxes 13 is connected to one sensor 12 at the left of the main pipe 2 and one sensor 12 at the right of the main pipe 2. As illustrated in FIG. 3, the connection boxes 13 include attachment bases 13a attached to the main pipe 2 with U bolts 9c.

The terminal unit 20 is connected to one of the four connection boxes 13 through an electric wire pipe 15. Specifically, the terminal unit 20 is disposed above the four connection boxes 13 at the front side of the main pipe 2. The terminal unit 20 is connected to the uppermost one of the four connection boxes 13 through the electric wire pipe 15, and is connected to the central management device 30 through the electric wire pipe 31. That is, as also illustrated in FIG. 2, the terminal unit 20 and the four connection boxes 13 are connected together in series. In this manner, in the sensor connection structure 11 disposed in the manifold 1, information on operating states of the steam traps 4 detected by the sensors 12 (hereinafter referred to as detection information of the sensors 12) is transmitted to the terminal unit 20 through the connection boxes 13. The electric wire pipes 14, 15, and 31 house electric wires (lead wires) therein, and serve as pipes protecting the wires.

Figure 2:
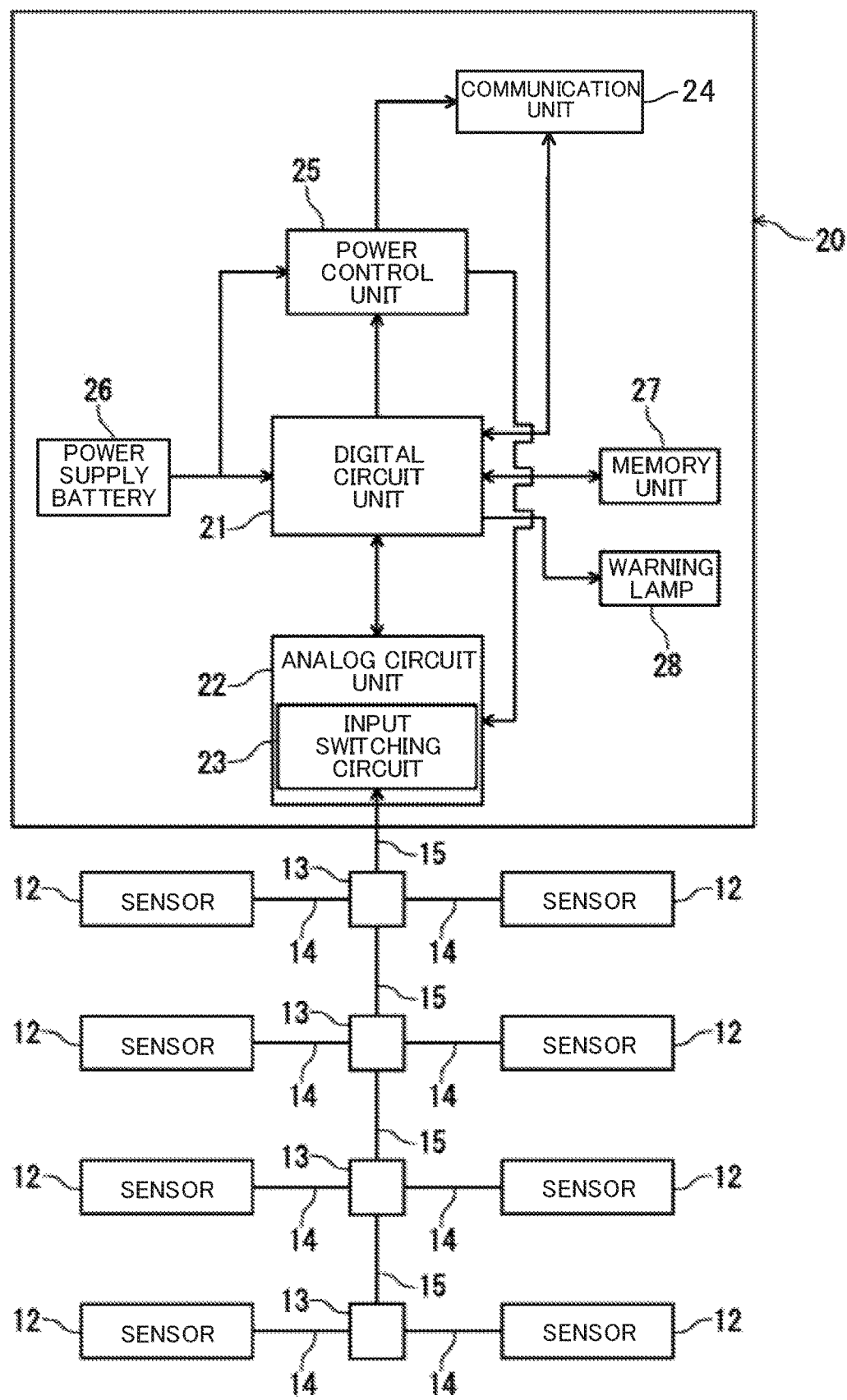
FIG. 2 is a block diagram illustrating a general configuration of a sensor connection structure according to the first embodiment.

As illustrated in FIG. 2, the terminal unit 20 includes a digital circuit unit 21, an analog circuit unit 22, a communication unit 24, a power control unit 25, a power supply battery 26, a memory unit 27, and a warning lamp 28. The detection information of the sensors 12 described above is transmitted (input) to the analog circuit unit 22. The communication unit 24 transmits and receives information to/from the central management device 30 through the electric wire pipe 31. The power supply battery 26 supplies electric power to the digital circuit unit 21, and supplies electric power to the communication unit 24 and the analog circuit unit 22 through the power control unit 25. The power control unit 25 controls electric power to be supplied to the communication unit 24 and the analog circuit unit 22. The memory unit 27 stores information.

At each set time period or at a set time based on setting information sent from the central management device 30 and stored in the memory unit 27, the digital circuit unit 21 controls the power control unit 25 to change the analog circuit unit 22 from a sleep mode to an operating mode. Then, the analog circuit unit 22 sequentially receives detection information of the eight sensors 12 by an input switching circuit 23. When this input is completed, the digital circuit unit 21 controls the power control unit 25 to change the analog circuit unit 22 to the sleep mode again. The detection information of the sensors 12 input to the analog circuit unit 22 is processed in the digital circuit unit 21. Thereafter, the digital circuit unit 21 controls the power control unit 25 to change the communication unit 24 from the sleep mode to the operating mode, transmits the processed detection information of the sensors 12 from the communication unit 24 to the central management device 30, and receives instruction information from the central management device 30 through the communication unit 24. After the transmission and reception, the digital circuit unit 21 controls the power control unit 25 to change the communication unit 24 to the sleep mode again.

Based on the detection information of the sensors 12 transmitted from the terminal unit 20, the central management device 30 determines operating states of the steam traps 4. Subsequently, the central management device 30 stores results of the determination, and if the steam traps 4 are determined to be abnormal, the central management device 30 instructs the terminal unit 20 to cause the warning lamp 28 to blink. In this manner, operating states of the steam traps 4 are monitored and determined by the operating state monitoring device 10.

As described above, in the sensor connection structure 11 according to this embodiment, the serially connected connection boxes 13 are connected to the sensors 12, and one of the connection boxes 13 is connected to the terminal unit 20. That is, in this embodiment, a plurality of sensors 12 are connected to each of the serially connected connection boxes 13, and one of the connection boxes 13 is connected to the terminal unit 20. Accordingly, it is possible to reduce complexity of wires (pipes) between the sensors 12 and the terminal unit 20.

In addition, in this embodiment, since the connection boxes 13 are arranged along the axis of the main pipe 2, the connection boxes 13 can be sequentially connected to the main pipe 2 along the axis of the main pipe 2. In this manner, wires (pipes) between the connection boxes 13 and the terminal unit 20 can be made compact, and thus, complexity of wires (pipes) can be further reduced.

Moreover, in the sensor connection structure 11 according to this embodiment, the sensors 12, the connection boxes 13, and the terminal unit 20 are connected to each other through the electric wire pipes 14 and 15 (electric wires). Thus, independently of installation situations of the sensors 12 and the terminal unit 20, detection information of the sensors 12 can be transmitted to the terminal unit 20 without fail. In this manner, in this embodiment, it is possible to provide the sensor connection structure 11 that can ensure transmission of detection information of the sensors 12 to the terminal unit 20 while reducing complexity between the sensors 12 and the terminal unit 20.

In addition, in the sensor connection structure 11 according to this embodiment, each of the connection boxes 13 is connected to one of the sensors 12 located at the left of the main pipe 2 and one of the sensors 12 located at the right of the sensors 12. Thus, as compared to a case where two sensors at the right of the main pipe are connected to one connection box, for example, complexity of wires (pipes) between the sensors 12 and the connection boxes 13 can be reduced.

In the sensor connection structure 11 according to this embodiment, since the terminal unit 20 is disposed in the main pipe 2, complexity of wires (pipes) between the terminal unit 20 and the connection boxes 13 can be reduced. Moreover, since the terminal unit 20 is disposed above the connection boxes 13 and connected to the uppermost one of the four connection boxes 13, complexity of wires (pipes) described above can be reduced, as compared to a case where the terminal unit is disposed between the connection boxes, for example. In addition, since the terminal unit 20 is disposed above the four connection boxes 13, the terminal unit 20 can be easily connected to the central management device 30.

Second Embodiment

Figure 4:
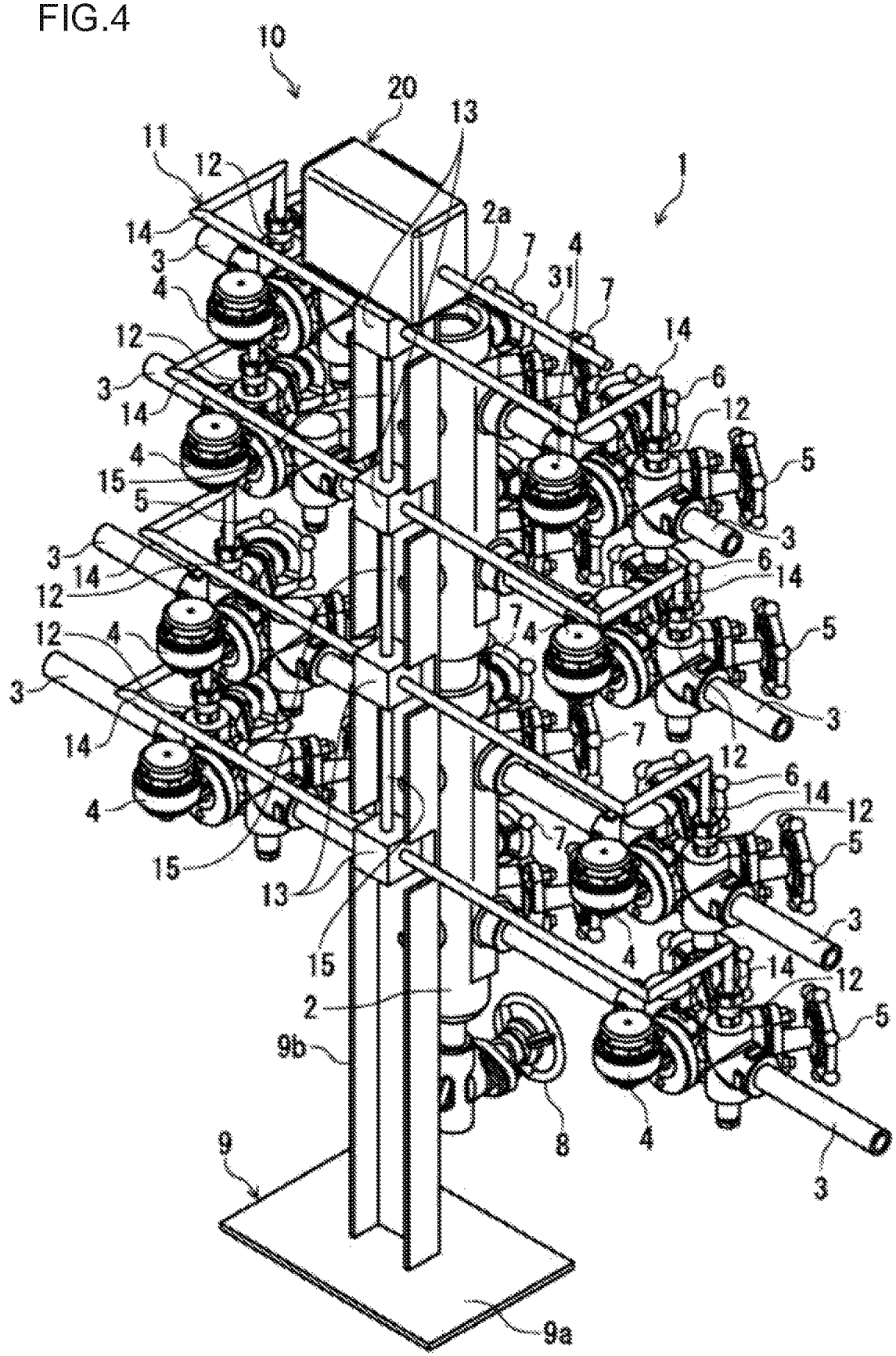
FIG. 4 is a perspective view illustrating a general configuration of a manifold and an operating state monitoring device according to a second embodiment when viewed from the rear.

A second embodiment of the present application will be described with reference to FIG. 4. In this embodiment, the attachment positions of connection boxes 13 and a terminal unit 20 are changed from those in the sensor connection structure 11 according to the first embodiment.

Specifically, in the second embodiment, the four connection boxes 13 and the terminal unit 20 are attached to the rear side of a strut 9b. That is, the connection boxes 13 and the terminal unit 20 are disposed at the rear side of a main pipe 2 with the strut 9b interposed therebetween. The four connection boxes 13 are arranged along an axis of the strut 9b at the rear side of the strut 9b, and are connected to each other in series through electric wire pipes 15. In a manner similar to the first embodiment, each of the four connection boxes 13 is connected to two sensors 12 disposed at the left and right of the main pipe 2 through electric wire pipes 14. The terminal unit 20 is disposed above the four connection boxes 13 at the rear side of the strut 9b. In a manner similar to the first embodiment, the terminal unit 20 is connected to the uppermost one of the four connection boxes 13 through an electric wire pipe, and is connected to a central management device (not shown) through an electric wire pipe 31.

In the sensor connection structure 11 according to the second embodiment, the connection boxes 13 and the terminal unit 20 are attached to the rear side of the strut 9b. Thus, the connection boxes 13, the terminal unit 20, and the electric wire pipes 14 and 15 are not easily affected by heat caused by a manifold 1. That is, although the manifold 1 in which high-temperature drain flows has a relatively high temperature, transfer of this high temperature to the connection boxes 13, the terminal unit 20, and other components can be reduced. In addition, since the connection boxes 13 and the terminal unit 20 are attached to the rear side of the strut 9b, the connection boxes 13 and the terminal unit 20 can be disposed at locations where valves such as steam traps 4 are not disposed, and thus, maintenance of the terminal unit 20 and other components can be easily performed.

Other Embodiments

The embodiments described above may be configured as follows.

Figure 5:
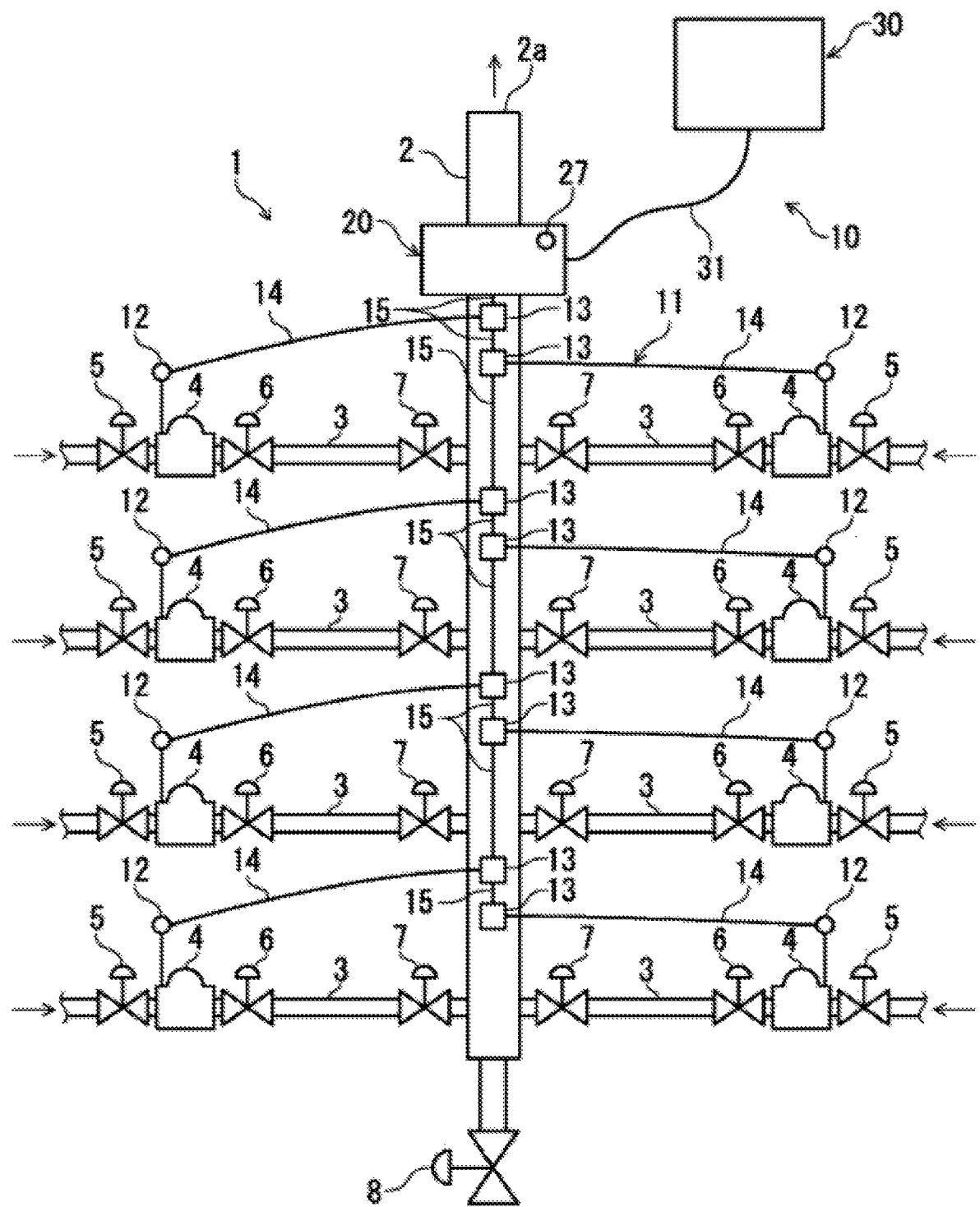
FIG. 5 is a front view schematically illustrating a general configuration of a manifold and an operating state monitoring device according to another embodiment.

For example, although the four connection boxes 13 are disposed in the first embodiment, eight connection boxes 13 may be disposed as illustrated in FIG. 5. That is, eight connection boxes 13 are connected to each other in series through electric wire pipes 15. Each of the eight connection boxes 13 are connected to one sensor 12 located at the left or right of a main pipe 2 through an electric wire pipe 14. That is, the same number of connection boxes 13 as that of the sensors 12 are provided, and are connected to the sensors 12 in one-to-one correspondence.

In the embodiments described above, the terminal unit 20 may be disposed at a location except the main pipe 2 and the strut 9b. For example, the terminal unit may be disposed on the upper surface of the base plate 9a of the attachment base 9 and connected to the lowermost one of the connection boxes 13 through an electric wire pipe, or may be attached to a structure (e.g., wall or column) except the manifold 1 and connected to one of the connection boxes 13 through an electric wire pipe.

In the embodiments described above, in the manifold 1, drain flows from the branch pipes 3 into the main pipe 2 and is collected therein. The sensor connection structure 11 according to the present application is also similarly applicable to a manifold in which drain branches from a main pipe to branch pipes. In this case, the branch pipes are also provided with valves to which sensors are attached.

In the embodiments described above, the numbers of the branch pipes 3, the sensors 12, and the connection boxes 13 are not limited to the numbers described above, and fluid except drain may flow in the manifold 1.

INDUSTRIAL APPLICABILITY

The technique disclosed in the present application is useful for a sensor connection structure in which a plurality of sensors disposed in a pipe unit including a main pipe and a plurality of branch pipes are connected to a terminal unit.

What is claimed is:

1. A sensor connection structure configured to be disposed in a pipe unit, the pipe unit including a main pipe, a plurality of branch pipes connected to each of left and right of the main pipe, and a plurality of valves disposed in the branch pipes, the pipe unit being configured to allow fluid to flow in the pipe unit, the main pipe extending vertically being attached to, and supported by, a strut extending vertically, the sensor connection structure comprising:
   a plurality of sensors that are respectively disposed on the plurality of valves and detect operating states of the valves;
   a plurality of connection boxes arranged along an axis of the main pipe, directly connected to each other in series through electric wire pipes, directly attached to the main pipe through a plate-shaped attachment base, and directly connected to the plurality of sensors through electric wire pipes; and
   a terminal unit connected to one of the plurality of connection boxes through an electric wire pipe.

2. The sensor connection structure of claim 1, wherein the main pipe is attached to, and supported by, a front side of the strut.

3. The sensor connection structure of claim 1, wherein each of the plurality of connection boxes is connected to one of the sensors located at the left of the main pipe and one of the sensors located at the right of the main pipe.

4. The sensor connection structure of claim 1, wherein the terminal unit is disposed on the main pipe.

* * * * *